BOWEN & BAKER.
Harvester.
No. 35,009.
2 Sheets—Sheet 2.
Patented April 22, 1862.
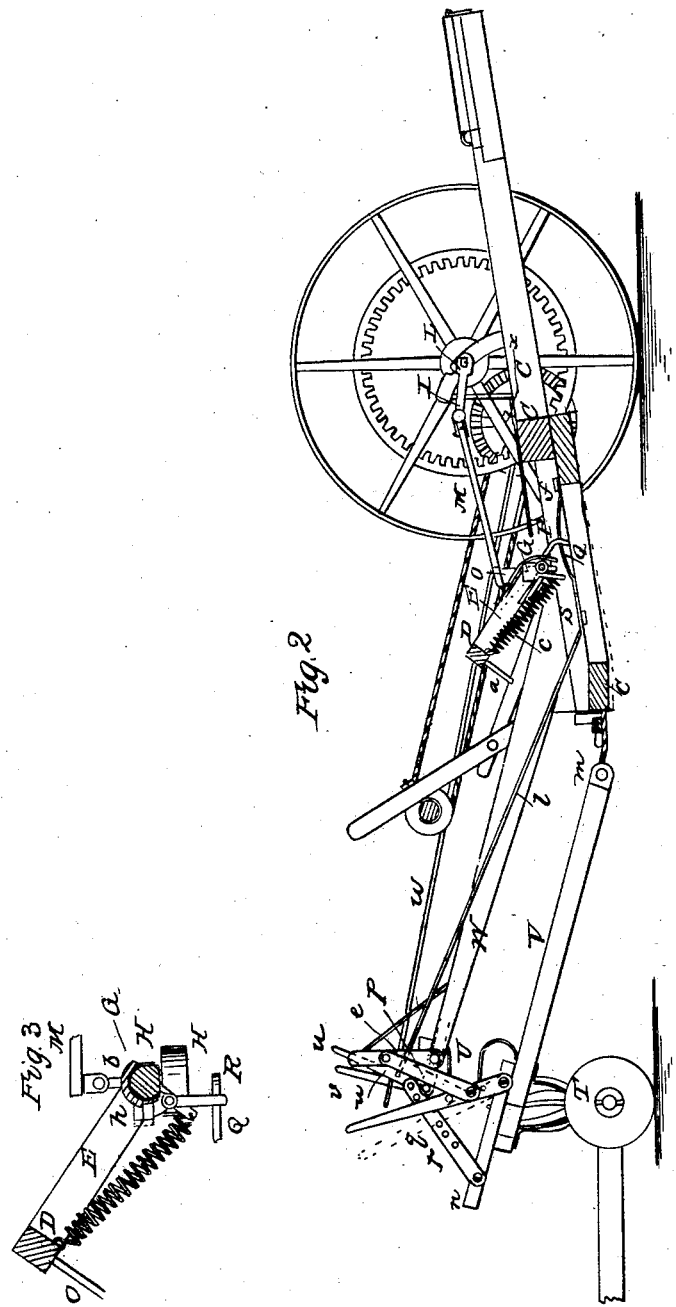

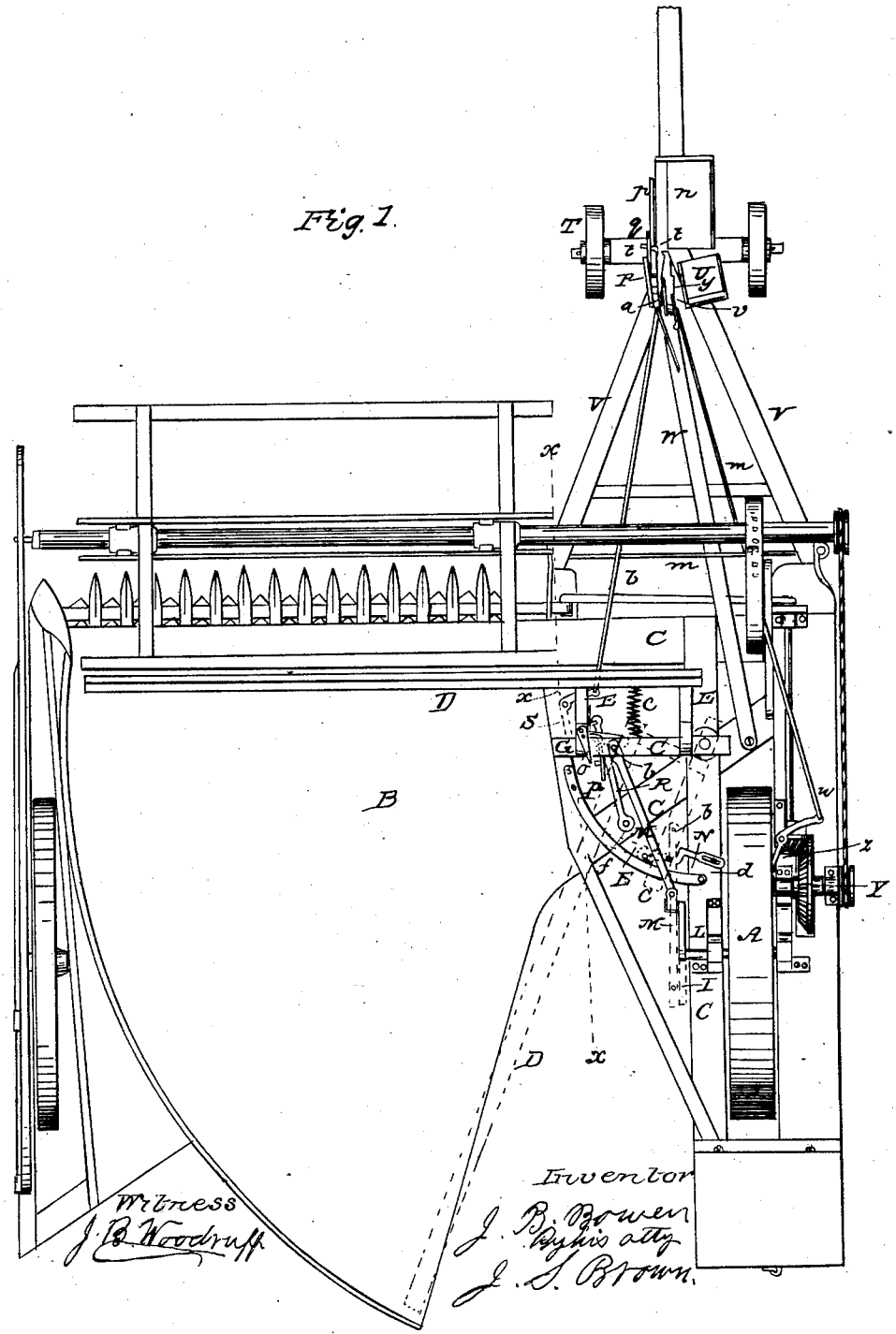

UNITED STATES PATENT OFFICE.

J. B. BOWEN AND JAMES E. BAKER, OF MADISON, WISCONSIN.

IMPROVEMENT IN HARVESTERS.

Specification forming part of Letters Patent No. 35,009, dated April 22, 1862.

*To all whom it may concern:*

Be it known that we, J. B. BOWEN and JAMES E. BAKER, of Madison, in the county of Dane and State of Wisconsin, have invented certain new and useful Improvements in Reaping-Machines; and we do hereby declare that the following is a full and exact description thereof, reference being had to the accompanying drawings, making part of this specification—

Figure 1 being a plan of a reaping-machine provided with our improvements; Fig. 2, a vertical section thereof in the plane indicated by the line *x x*, Fig. 1; Fig. 3, view of a part detached, the scale being enlarged.

Like letters designate corresponding parts in all the figures.

Our first improvement consists in the device for automatically actuating the rake D, so that it may have all the movements required for giving it complete efficiency. The rake moves in the arc of a circle, so as to rake the grain from a platform, B, having a corresponding form, as shown in Fig. 1. Over this platform the rake has a reciprocating movement, its teeth $a\ a$ being vertical and resting on or moving closely above the platform, while passing backward over it, for gathering up and sweeping off the gavels of grain; but in its return or forward movement it is elevated far enough above the platform to keep entirely clear of the grain, as indicated in Figs. 2 and 3. To enable the rake to perform these movements, it has two pivot motions—one vertical upon a supporting arm or carrier, G, and the other horizontal—by means of a corresponding movement of the carrier-arm G around a pivot, H, which is secured to the frame C of the machine. The former movement is effected by the use of arms E E, which project sidewise from one end of the rake-head, substantially as shown, and turn around wrists formed on the carrier G. The length of the arms E E is sufficient to elevate the rake as high as desired by turning them, say, forty-five degrees on the carrier. The simple horizontal movement of the carrier G on its pivot H gives the corresponding movement to the rake, which is situated parallel with the carrier. This rake-carrier G does not extend over the platform at all, but has its position and movement at one side thereof. By this arrangement it offers no impediment whatever to the falling grain, and is a valuable improvement in that respect. The double arms E E, at some distance apart, afford sufficient support and firmness to the rake-head, although projecting so far beyond its carrier. The reciprocating pivot movement of the rake-carrier G is communicated from the driving-wheel A by means of a crank, I, on the shaft L thereof, and of a connecting-rod, M, which is pivoted at $b$ to the carrier. This movement of the rake-carrier not only gives the horizontal motion to the rake, but furnishes the power to automatically produce the vertical movement thereof on the arms E E as follows:

On the frame C of the machine, inside of the driving-wheel, is secured a stop, N, Fig. 1, it being adjustable in position by means of a slot and tightening-screw, $d$. Against this stop a cam projection, $o$, secured to one arm E of the rake and bending downward, strikes as the carrier G is drawn backward by the crank I, and as the carrier is moved farther backward the effect is to turn the rake D upward on the carrier G to the height required, in which position it is held by a catch, $h$, on the carrier, springing into a notch, $g$, of the arm E, all substantially as shown in Fig. 3. Thus the rake is held up while it is making its forward movement; but just as it completes its movement forward a lever, P, which is hinged to the carrier G, and bears on its upper arm the spring-catch $h$, while its lower arm projects downward, Fig. 3, strikes another stop, Q, and releases the said catch from the notch $g$, thus leaving the rake free to descend to the platform B by its own weight. If the weight of the rake is not sufficient to insure its descent, a spring, $c$, is employed to bring it down. The rake then performs its backward movement, close upon the platform B, raking off the grain, and at the close of its movement is raised again by the stop N, as above set forth. The stop Q projects from an arm, R, which is pivoted at $f$ to the frame C. The other end is jointed to a lever, S, (or its equivalent,) which is controlled by a rod, $l$, reaching forward near to the driver's seat U, and attached there to a lever, $u$. The driver thus at any time can move the arm R one side sufficiently to clear the stop Q from the way of the lever P, and thus prevent the rake's descent upon the platform B and stop the raking, when desired. By reversing the position of the lever $u$, the rake is again brought into action.

The driver's seat U is supported by the draft-wheels T T in front of the machine. Here the driver not only controls the movements of the rake, as above specified, but also, by means of a lever, $v$, catch $y$, connecting-rod $w$, and bent lever $j$, couples the driving-pinion X, Fig. 2, to the shaft of the bevel-wheel Y, whereby the cutter-bar and reel are worked, and uncouples the same when required. In this position, also, the driver raises and lowers the cutters and front edge of the machine as follows: From the frame-work supported by the draft-wheels T T two rigid branching arms, V V, extend backward and downward near to the front edge of the machine, and are hinged thereto at $m$. These serve the special purpose of drawing the machine by. Another rigid arm, W, is firmly secured to the machine, and extends thence forward and upward to a position nearly over the said frame-work, substantially as represented in the drawings. To a branch arm, $o$, of this latter arm W is pivoted a connecting-rod, $p$, and to a side piece, $n$, of the frame-work is pivoted a "sword" arm, $r$, which is provided with a set of holes, $s\ s$, at regular distances apart. Then a lever, $q$, is pivoted to the frame-piece $n$ back of the sword-arm $r$, and extends upward and forward, so as to cross the sword-arm, as shown. The lower end of the connecting-rod $p$ is pivoted to this lever in different positions. The front end of the lever $q$ is supported by a pin, $t$, (or its equivalent,) inserted through one of the holes $s\ s$ of the sword-arm $r$, and is managed by the driver as he sits in his seat. By raising the lever $q$ the front edge of the machine is raised, and vice versa, and it is held in the different positions by inserting the pin $t$ in the proper holes $s\ s$.

What we claim as our invention, and desire to secure by Letters Patent, is—

1. The combination of the two projecting arms E E of the rake-head, the rake-carrier G, and vertical pivot H, stationary on the frame of the machine, the rake hinging around the rake-carrier, and the rake-carrier hinging around the pivot, when the rake-carrier is so constructed and situated as not to extend over the platform, substantially as and for the purpose herein specified.

2. The combination of the arm R, which bears the stop Q, with the lever S and rod $l$, arranged substantially as and for the purpose herein specified.

In witness whereof we affix our signatures this 16th day of December, 1861.

J. B. BOWEN.
JAS. E. BAKER.

Witnesses:
L. J. INGMAN,
F. L. VAN BERGEN.